(12) United States Patent
Engel et al.

(10) Patent No.: US 7,841,370 B2
(45) Date of Patent: Nov. 30, 2010

(54) FOAMING LIQUID MATERIAL AND USE THEREOF FOR REDUCING NOISE IN MOUNTED TIRES

(75) Inventors: Marc Engel, Bissen (LU); Jan Leyssens, Leglise-Beheme (BE); Wolfgang Gnoerich, Mersch (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 703 days.

(21) Appl. No.: 11/881,037

(22) Filed: Jul. 25, 2007

(65) Prior Publication Data

US 2009/0026006 A1    Jan. 29, 2009

(51) Int. Cl.
*B65B 1/04* (2006.01)
(52) U.S. Cl. .................. 141/9; 141/2; 141/38; 523/166
(58) Field of Classification Search ............ 141/2, 141/9, 38, 100, 105; 152/450; 523/166
See application file for complete search history.

(56) References Cited

U.S. PATENT DOCUMENTS

| | | | | |
|---|---|---|---|---|
| 3,843,586 A | * | 10/1974 | Wolf ........................ 206/302 |
| 4,027,712 A | * | 6/1977 | Verdier ..................... 152/311 |
| 4,248,811 A | * | 2/1981 | Doyle et al. ............... 264/46.6 |
| 5,083,596 A | | 1/1992 | Kato et al. ............... 152/154.1 |
| 5,639,319 A | * | 6/1997 | Daly ......................... 152/450 |
| 5,765,601 A | | 6/1998 | Wells et al. .................. 141/38 |
| 5,916,931 A | * | 6/1999 | Adams et al. ............... 523/166 |
| 6,729,373 B2 | * | 5/2004 | Yukawa et al. .............. 152/450 |
| 6,889,723 B2 | * | 5/2005 | Gerresheim et al. ........... 141/38 |
| 7,614,865 B1 | * | 11/2009 | Steinke et al. ............... 425/112 |
| 2001/0004924 A1 | | 6/2001 | Aoki et al. ................ 156/394.1 |

FOREIGN PATENT DOCUMENTS

JP    2001 047809    2/2001

OTHER PUBLICATIONS

European Search Report completed Sep. 4, 2009.

* cited by examiner

*Primary Examiner*—Timothy L Maust
(74) *Attorney, Agent, or Firm*—John D. DeLong

(57) ABSTRACT

The present invention is directed to a method of reducing noise transmission in a pneumatic tire and wheel assembly comprising an inflation cavity, the method comprising the step of adding to the inflation cavity from about 0.1 to about 1 volume percent, based on the volume of the inflation cavity, of a repeatably foamable liquid.

11 Claims, 4 Drawing Sheets

FOAMING LIQUID MATERIAL AND USE THEREOF FOR REDUCING NOISE IN MOUNTED TIRES

BACKGROUND OF THE INVENTION

Government regulations and consumer preferences continue to compel a reduction in the acceptable noise levels produced from the tires of passenger vehicles. One source of road noise is resonance within the air chamber enclosed by the innermost surface of the tire and the rim. One type of effort to reduce tire noise is damping the sound from the air vibration in the air chamber, which efforts have focused mainly on altering the innermost surface of the tire adjacent the tire carcass. Shortcomings in these previous efforts, as well as new stricter regulations regarding noise reduction, have provided a need for further improvements to the tire to reduce sound transmission due to vibrations within the air chamber.

SUMMARY OF THE INVENTION

The present invention is directed to a method of reducing noise transmission in a pneumatic tire and wheel assembly comprising an inflation cavity, the method comprising the step of adding to the inflation cavity from about 0.1 to about 1 volume percent, based on the volume of the inflation cavity, of a repeatably foamable liquid.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE DRAWINGS

Figure 1:
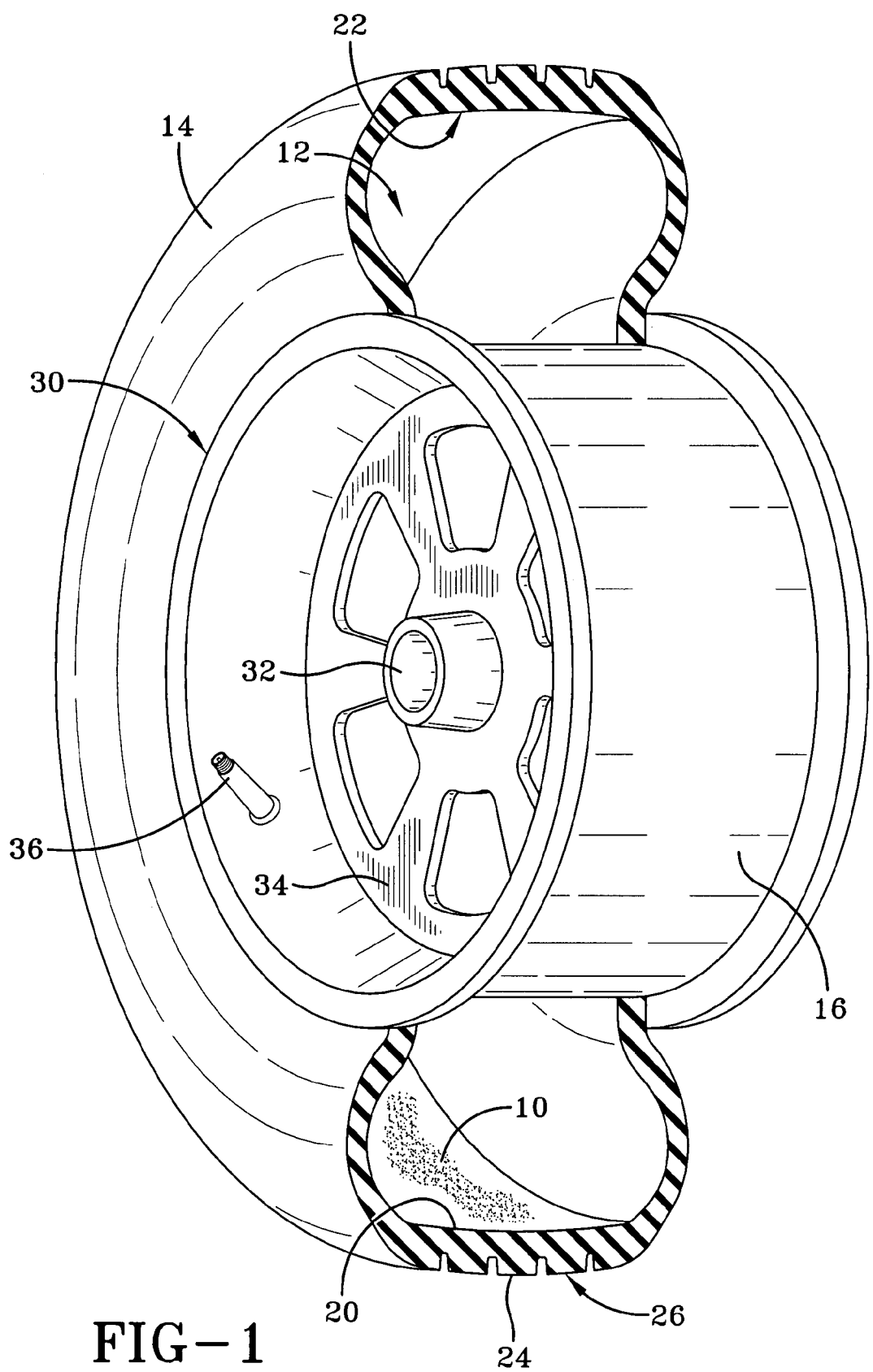
FIG. 1 is a perspective view of a tire mounted on a rim with a portion of the tire being cut-away to show unfoamed liquid illustrating an embodiment in accordance with the present invention.

The present invention, several embodiments of which are as shown in FIGS. 1-5, is directed towards repeatably foamable liquids 10 and uses thereof for reducing noise in an air cavity 12 of a tire 14 mounted on a rim 16.

The repeatably foamable liquid 10 of the present invention can include any liquid that may foam under agitation, such as that imparted by the rolling motion of a tire. By repeatably foamable, it is meant that the liquid foams under agitation to form a cellular mass of foam, but then relaxes upon discontinuation of the agitation such that the cells coalesce and the foam relaxes to the original liquid state. Upon agitation again, the liquid will again form the cellular mass of foam.

In one embodiment, the repeatably foamable liquid may be a liquid soap or detergent, optionally with a sufficient amount of water added to aid in the foaming of the liquid. In one embodiment, the volume ratio of liquid soap or detergent to water may range from 5:1 to 1:5.

The ratio of the volume of repeatably foamable liquid to the volume of air cavity 12 is relatively low. In one embodiment, the volume of unfoamed liquid in the air cavity 12 ranges from about 0.1 to about 1 volume percent, based on the volume of the air cavity 12. In one embodiment, the volume of unfoamed liquid in the air cavity 12 ranges from about 0.25 to about 0.75 volume percent, based on the volume of the air cavity 12.

As best shown in FIG. 1, the tire 14 includes an inner surface 20 defining a tire cavity 22 and an outer surface 24 defining a tread 26. The tire 14 is shown already mounted on the rim 16 of a wheel 30 to define the air cavity 12. For purposes herein, the rim 16 includes any portion of the wheel 30 that constitutes a portion of the air cavity 12. The wheel 30 also includes a hub 32 attached to the rim 16 via spokes 34. The tire 14 may be mounted on the rim 16 by any means known in the art, such as via a tire-mounting machine (not shown).

In one embodiment, prior to mounting the tire 14 on the rim 16, the repeatably foamable liquid 10 is provided in the tire cavity 22. This provision may be made manually such as by squirting or pouring the repeatably foamable liquid into the tire cavity 22. Then, the tire 14 is mounted on the rim 16.

Figure 2:
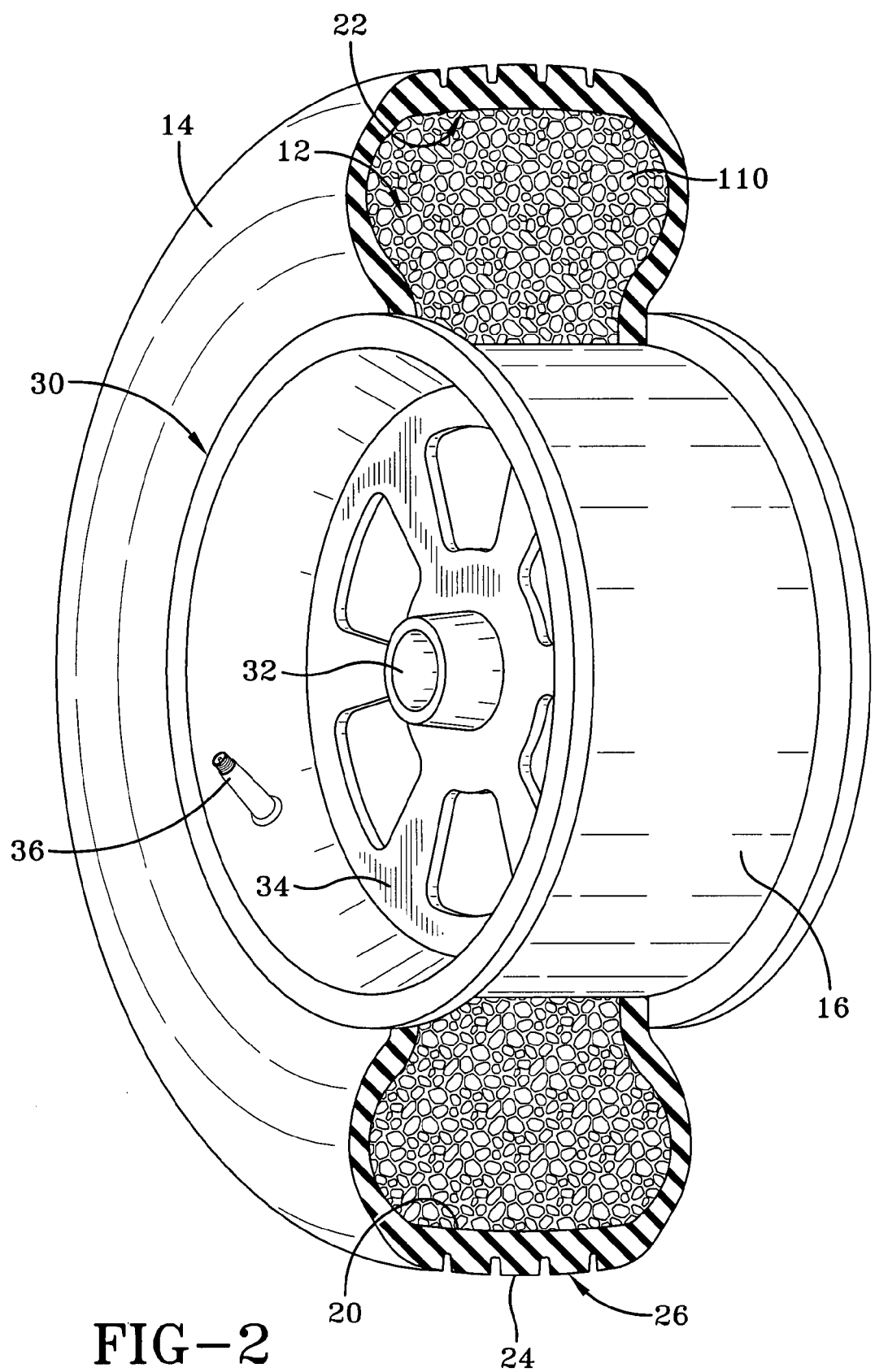
FIG. 2 is a perspective view of a tire mounted on a rim with a portion of the tire being cut-away to show foamed liquid illustrating an embodiment in accordance with the present invention.

In FIG. 2, the repeatably foamable liquid is shown in the foamed state 110, upon agitation due to tire rotation or the like. In the embodiment shown in FIG. 2 the foam 110 fills the tire cavity 22; more broadly, depending on the liquid, the volume fraction of liquid used and the level of agitation, the foam 110 will at least partially fill the tire cavity 22.

Figure 3:
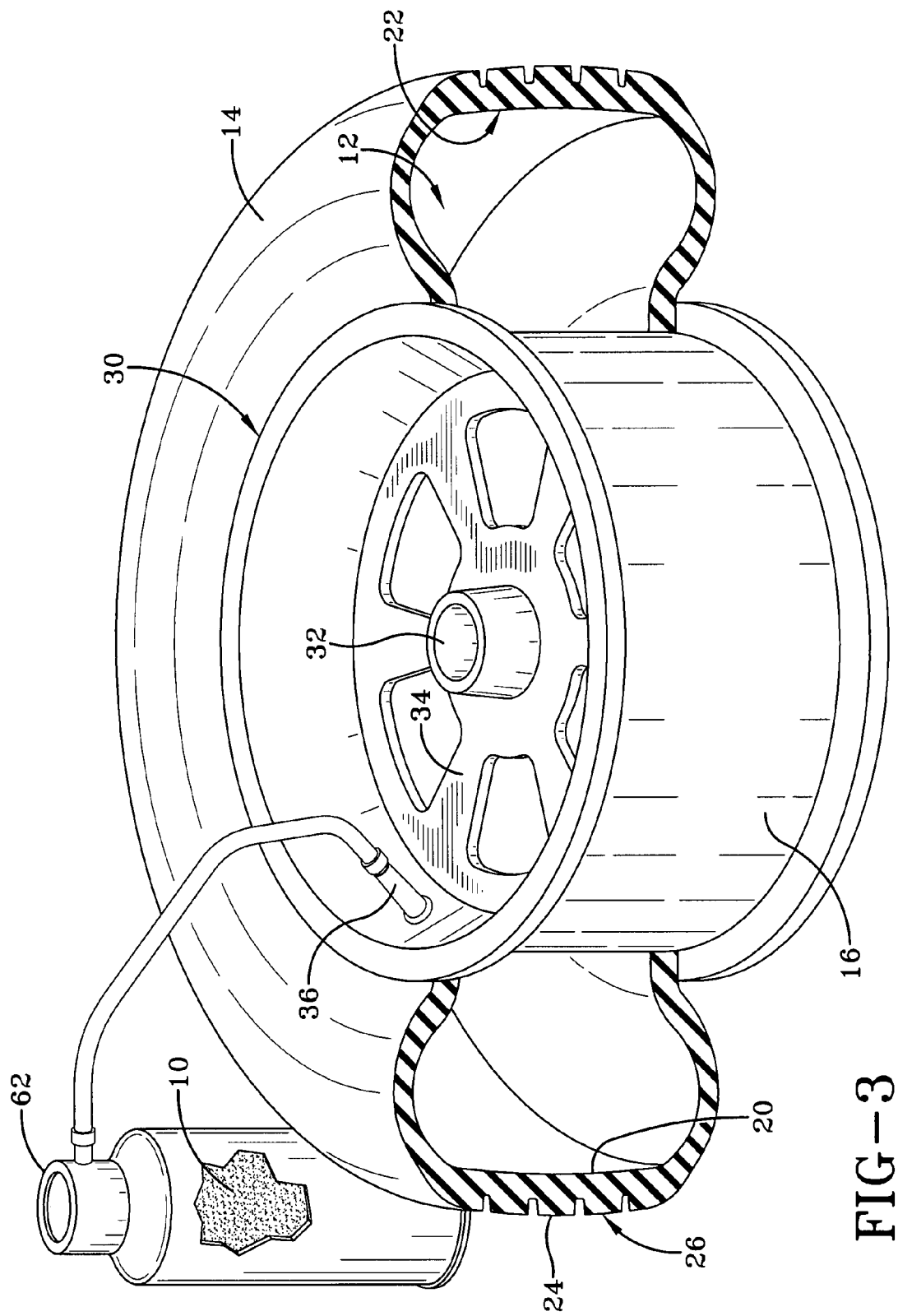
FIG. 3 is a perspective view of a canister containing repeatably foamable liquid cooperating with a valve associated with the air cavity of a mounted tire illustrating another embodiment in accordance with the present invention.

In FIG. 3, the repeatably foamable liquid 10 is provided in an after market container 62 that is fitted, e.g. screwed, onto valve 36 that is associated with air cavity 12 of mounted tire 14. The repeatably foamable liquid 10 may be introduced into the air cavity 12 via the valve 36. The tire 14 would typically be in a deflated state during introduction of the repeatably foamable liquid. The tire 14 would then be inflated after removal of the container 62.

It should be understood by one skilled in the art that the amount of repeatably foamable liquid added to the air cavity 12 is relatively low, such that the added weight of the liquid is negligible compared to the weight of the tire/wheel assembly. In this manner, the weight of the liquid is insufficient to cause concern about excess weight added to the vehicle onto which the tires are mounted.

A non-limiting example of the use of a repeatably foamable liquid 10 to reduce the noise in the air cavity 12 of the tire 14 in accordance with the present invention is presented below.

EXAMPLE 1

In this example, the effect of a repeatably foamable liquid on the noise level in pneumatic tire mounted on a wheel is illustrated.

Into the cavity of a Goodyear Eagle NCT5 205/55R16 tire was introduced 250 ml of a mixture of 25 volume percent water and 75 volume percent dishwasher detergent. The cavity volume of the tire was about 37 liters, giving a liquid fraction of about 0.7 volume percent. The tire was pressurized with air to 2.3 bar and bounced approximately 20 times on a floor to agitate the liquid. A second identical tire without added liquid was used as a control.

Figures 4, 5:
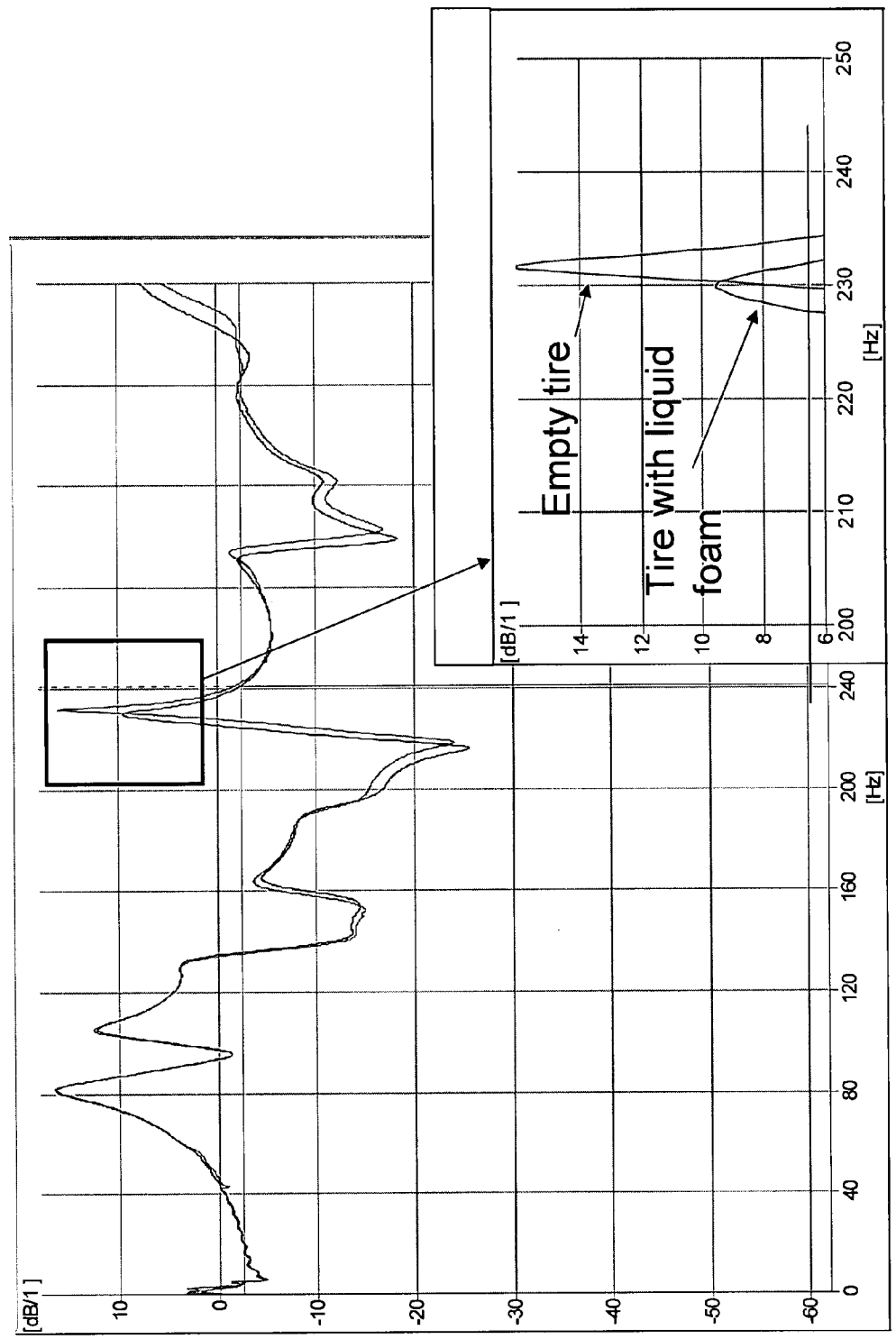
FIG. 4 is a graph illustrating noise reduction in an air cavity of a mounted tire using repeatably foamable liquid in accordance with the present invention.
FIG. 5 is a graph showing an enlarged portion of the graph in FIG. 4.

The tires were then tested for tire force transmissibility by measuring the force generated at the hub for a unit force hammer impact on the tread surface. Typically, for a tire the response of force transmissibility vs frequency shows two distinct peaks, the so-called first vertical resonance at about 90 Hz and the tire cavity resonance at about 220 to 240 Hz. The response curve is shown in FIGS. 4 and 5. Surprisingly and unexpectedly, the tire containing only 0.7 volume percent of the repeatably foamable liquid showed an approximately 6.5 dB decrease in the tire cavity resonance peak as compared with the control tire, as seen in FIG. 5.

The use of repeatably foamable liquid in the air cavity may then reduce the tire cavity resonance by at least 5 dB. In another embodiment, the use of repeatably foamable liquid in the air cavity may reduce the tire cavity resonance by at least 10 dB.

Accordingly, there are provided repeatably foamable liquids 10 and uses thereof for reducing noise in air cavities 12 of mounted tires.

While the present invention has been illustrated by the description of the various embodiments thereof, and while the embodiments have been described in considerable detail, it is not intended to restrict or in any way limit the scope of the appended claims to such detail. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of Applicants' general inventive concept.

What is claimed is:

1. A method for reducing noise in an air cavity of a mounted tire, comprising the step of:
   providing in the air cavity from about 0.1 to about 1 volume percent, based on the volume of the inflation cavity, of a repeatably foamable liquid;
   wherein the repeatably foamable liquid is a liquid that foams under agitation to form a cellular mass of foam, but then relaxes upon discontinuation of the agitation such that the cells coalesce and the foam relaxes to the original liquid state.

2. The method of claim 1, wherein from about 0.25 to about 0.75 volume percent of the repeatably foamable liquid is added to the air cavity.

3. The method of claim 1, wherein the repeatably foamable liquid comprises a liquid soap or detergent.

4. The method of claim 1, wherein the repeatably foamable liquid comprises water and a soap or detergent.

5. The method of claim 1, wherein the repeatably foamable liquid comprises a mixture of water and at least one of soap and detergent, wherein the volume ratio of liquid soap or detergent to water may range from 5:1 to 1:5.

6. The method of claim 1, wherein the repeatably foamable liquid is a liquid that foams under agitation to form a cellular mass of foam, but then relaxes upon discontinuation of the agitation such that the cells coalesce and the foam relaxes to the original liquid state.

7. The method of claim 1, wherein the repeatably foamable liquid is provided in the air cavity by adding the liquid prior to mounting the tire on a rim.

8. The method of claim 1, wherein the repeatably foamable liquid is provided in the air cavity by adding the liquid through a valve after mounting the tire on a rim.

9. The method of claim 1, wherein in the mounted tire provided with repeatably foamable liquid, the tire cavity resonance is reduced as compared to an otherwise identical mounted tire not provided with repeatably foamable liquid.

10. The method of claim 1, wherein in the mounted tire provided with repeatably foamable liquid, the tire cavity resonance is reduced by at least 10 dB as compared to an otherwise identical mounted tire not provided with repeatably foamable liquid.

11. The method of claim 1, wherein in the mounted tire provided with repeatably foamable liquid, the tire cavity resonance is reduced by at least 5 dB as compared to an otherwise identical mounted tire not provided with repeatably foamable liquid.

* * * * *